US007729739B2

(12) United States Patent
Acar et al.

(10) Patent No.: US 7,729,739 B2
(45) Date of Patent: Jun. 1, 2010

(54) HEAT DIFFUSION BASED DETECTION OF STRUCTURES OF INTEREST IN MEDICAL IMAGES

(75) Inventors: Burak Acar, Istanbul (TR); Ender Konukoglu, Istanbul (TR); Christopher F. Beaulieu, Los Altos, CA (US); Sandy A. Napel, Menlo Park, CA (US); David S. Paik, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1232 days.

(21) Appl. No.: 11/000,515

(22) Filed: Nov. 29, 2004

(65) Prior Publication Data

US 2005/0149286 A1 Jul. 7, 2005

Related U.S. Application Data

(60) Provisional application No. 60/526,849, filed on Dec. 3, 2003.

(51) Int. Cl.
*A61B 6/00* (2006.01)
(52) U.S. Cl. .................. 600/407; 382/128; 600/425
(58) Field of Classification Search ................ 600/407, 600/431, 437; 382/128
See application file for complete search history.

(56) References Cited

U.S. PATENT DOCUMENTS 5,458,111 A 10/1995 Coin .......................... 128/747

| | | | |
|---|---|---|---|
| 5,491,627 A | 2/1996 | Zhang et al. | 364/413.2 |
| 5,891,030 A | 4/1999 | Johnson et al. | 600/407 |
| 5,920,319 A | 7/1999 | Vining et al. | 345/420 |
| 5,971,767 A | 10/1999 | Kaufman et al. | 434/267 |
| 6,023,637 A * | 2/2000 | Liu et al. | 600/474 |
| 6,083,162 A | 7/2000 | Vining | 600/407 |
| 2002/0164061 A1* | 11/2002 | Paik et al. | 382/131 |
| 2005/0283071 A1* | 12/2005 | Ripoll et al. | 600/425 |

OTHER PUBLICATIONS

Jianhua Yao et al. (2004) in a paper entitled "Colonic Polyp Segmentation in CT Colonography-Based on Fuzzy Clustering and Deformable Models" and published in IEEE Transactions on Medical Imaging, vol. 23, No. 11, p. 1344-1352.

(Continued)

*Primary Examiner*—Long V Le
*Assistant Examiner*—Vani Gupta
(74) *Attorney, Agent, or Firm*—Lumen Patent Firm

(57) ABSTRACT

A method for detecting and identifying structures of interest such as colonic polyps or similar structures like lung nodules in volumetric (medical) images data is provided. The method includes obtaining a heat diffusion field (HDF) by applying a heat diffusion scheme to a volume of interest that includes structures. The obtained heat diffusion field is then used for identifying a structure of interest from the structures in the volume of interest using a geometrical analysis of the heat diffusion field. The heat diffusion scheme is, at least partly, governed by non-linear diffusion parameters. The identification includes two parts: (i) the computation of a spherical symmetry parameter, and (ii) the performance of a local analysis of the volume of interest and computation of a triangulization parameter.

7 Claims, 4 Drawing Sheets

Initial Heat Distribution

Hot Lumen (Air)

Heat Distribution at Iteration #5

Final Heat Distribution

The HDF and The Hit

OTHER PUBLICATIONS

Hiroyuki Yoshida et al. (2002) in a paper entitled "Computerized Detection of Colonic Polyps at CT Colonography on the Basis of Volumetric Features: Pilot Study" and published in Radiology 222:327-336.

Hiroyuki Yoshida (2001) in a paper entitled "Three Dimensional Computer-Aided Diagnosis Scheme for Detection of Colonic Polyps" and published in IEEE Transactions on Medical Imaging, vol. 20, No. 12 p. 11261-1274.

Gabriel Kiss et al. (2002) in a paper entitled "Computer-Aided Diagnosis in Virtual Colonography Via Combination of Surface Normal and Sphere Fitting Methods" and published in Eur. Radiology 12:77-81.

Ronald M. Summers et al. (2000) "Automated Polyp Detector for CT Colonography: Feasibility Study" and published in Radiology 216:284-290.

Ronald M. Summers et al. (2001) "Automated Polyp Detection at CT Colonography: Feasibility Assessment in a Human Population" and published in Radiology 219:51-59.

D.J. Vining (1999) in a paper entitled "Virtual Colonoscopy with Computer-Assisted Polyp Detection" and published in Computer-Aided Diagnosis in Medical Imaging p. 445-452.

Haidar H, Bouix S, Levitt JJ, et al. Characterizing the shape of anatomical structures with Poisson's equation. IEEE Transactions on Medical Imaging 25(10)1249-1257 2006.

* cited by examiner

Distribution at Detected Polyp and Non-Polyp according to FA and TU values

Fa threshold = 0.1231 and
FU = 3 at 6/7 sensitivity

Fa threshold = 0.2411 and
FU = 17 at 7/7 sensitivity

HEAT DIFFUSION BASED DETECTION OF STRUCTURES OF INTEREST IN MEDICAL IMAGES

CROSS-REFERENCE TO RELATED APPLICATIONS

This application is cross-referenced to and claims priority from U.S. Provisional Application 60/526,849 filed Dec. 3, 2003, which is hereby incorporated by reference.

STATEMENT REGARDING FEDERALLY SPONSORED RESEARCH OR DEVELOPMENT

This invention was supported in part by grant number R01 CA72023 from the National Institutes of Health (NIH/NCI). The U.S. Government has certain rights in the invention.

FIELD OF THE INVENTION

The present invention relates generally to medical imaging. More particularly, the present invention relates to methods of detecting polyps in medical images.

BACKGROUND

Computed Tomographic Colonography (CTC) is a minimally invasive technique that employs X-Ray CT imaging of the abdomen and pelvis following cleansing and air insufflation of the colon. Originally proposed in the early 1980's, it became practical in the early 1990's following the introduction of helical CT and advances in computer graphics. Currently available multi-slice helical X-Ray CT scanners are capable of producing hundreds of high-resolution (<1 mm cubic voxel) images in a single breath hold. Conventional examination of these source images is rather time-consuming and the detection accuracy is unavoidably limited by human factors such as attention span and eye fatigue. Several visualization and navigation techniques have been proposed to help the radiologists. However, computer aided detection (CAD) tools are envisioned to improve the efficiency and the accuracy beyond what can be achieved by visualization techniques alone. Several studies have investigated CAD for CTC. Vining et al. used abnormal colon wall thickness to detect colonic polyps (See e.g. Vining et al. (1999) in a paper entitled "*Virtual colonoscopy with computer-assisted polyp detection*" and published in Computer-Aided Diagnosis in Medical Imaging pp. 445-452, Amsterdam, Netherlands: Elsevier Science B. V.). Summers et al. used the mean, gaussian and principal curvatures of the colon surface and showed good preliminary results for phantom and patient data (See e.g. Summers et al. (2000) in a paper entitled "*Automated polyp detector for CT colonography: Feasibility study*" and published in Radiology 216:284-290; Summers et al. (2001) in a paper entitled "*Automated polyp detection at CT colonography: Feasibility assessment in a human population*" and published in Radiology 219:51-59). Kiss et al. used surface normals along with sphere fitting (Kiss et al. (2002) in a paper entitled "*Computer-aided diagnosis in virtual colonography via combination of surface normal and sphere fitting methods*" and published in European Radiology 12:77-81), while Yoshida et al. used both the pre-segmented surface differential characteristics captured by a shape index, and the gradient vector field of the CT data (Yoshida et al. (2001) in a paper entitled "*Three-dimensional computer-aided diagnosis scheme for detection of colonic polyps*" and published in IEEE Transactions on Medical Imaging 20:1261-1274- Yoshida et al. (2002) in a paper entitled "*Computerized detection of colonic polyps at CT colonography on the basis of volumetric features: Pilot study*" and published in Radiology 222:327-336). Paik et al. proposed the surface normal overlap algorithm based on the observation that for locally spherical and hemispherical structures, large numbers of surface normals intersect near the centers of these structures (See U.S. Published Patent Application No. 2002-0164061 published on Nov. 7, 2002, which is assigned to the same assignee as the present invention). To improve specificity, Gokturk et al. used triples of randomly oriented orthogonal cross-sectional images of pre-detected suspicious structures which are then classified by support vector machines (See U.S. Published Patent Application No. 2004-0165767 published on Aug. 26, 2004, which is assigned to the same assignee as the present invention), while Acar et al. modeled the way radiologists utilize 3D information as they are examining a stack of 2D images (See U.S. Published Patent Application No. 2004-0141638 published on Jul. 22, 2004, which is assigned to the same assignee as the present invention). Even though a lot of progress has been made in this art, there is still a need to develop new methods to detect and characterize polyps, especially in 3D.

SUMMARY OF THE INVENTION

The present invention is a method for detecting and identifying structures of interest such as colonic polyps or similar structures like lung nodules in volumetric (medical) images data. The method includes obtaining a heat diffusion field (HDF) by applying a heat diffusion scheme to a volume of interest that includes structures. The obtained heat diffusion field is then used for identifying a structure of interest from the structures using a geometrical analysis of the heat diffusion field. The heat diffusion scheme is, at least partly, governed by non-linear diffusion parameters. The identification includes two parts (i) the computation of a spherical symmetry parameter, and (ii) the performance of a local analysis of the volume of interest and computation of a triangulization parameter.

In one embodiment, the volume of interest is a colon or a colon wall. The structures as part of the colon or colon wall are then protruding structures and non-protruding structures, whereby the structure of interest is one of the protruding structures. More specifically, the protruding structures are e.g. polyps, haustral folds or other elongated structures and the non-protruding structures are e.g. flat colon wall regions and regions in between haustral folds. The structures of interest to be detect and identified are polyps.

In another embodiment, the volume of interest is a lung. The structures as part of the lung are then primarily stand-alone structures, whereby the structure of interest is one of the stand-alone structures. More specifically, the structures of interest to be detected and identified are lung nodules.

The present invention could also be described as a method of detecting and identifying structures of interest in volumetric images with a first detection step and a second detection step. The first step detects a structure of interest from a heat diffusion field obtained by applying a heat diffusion scheme, which is at least partly governed by nonlinear diffusion parameters, to a volume of interest with structures. The second step is an enhancement of the first detection by performing a geometrical analysis of the heat diffusion field.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Figure 1:
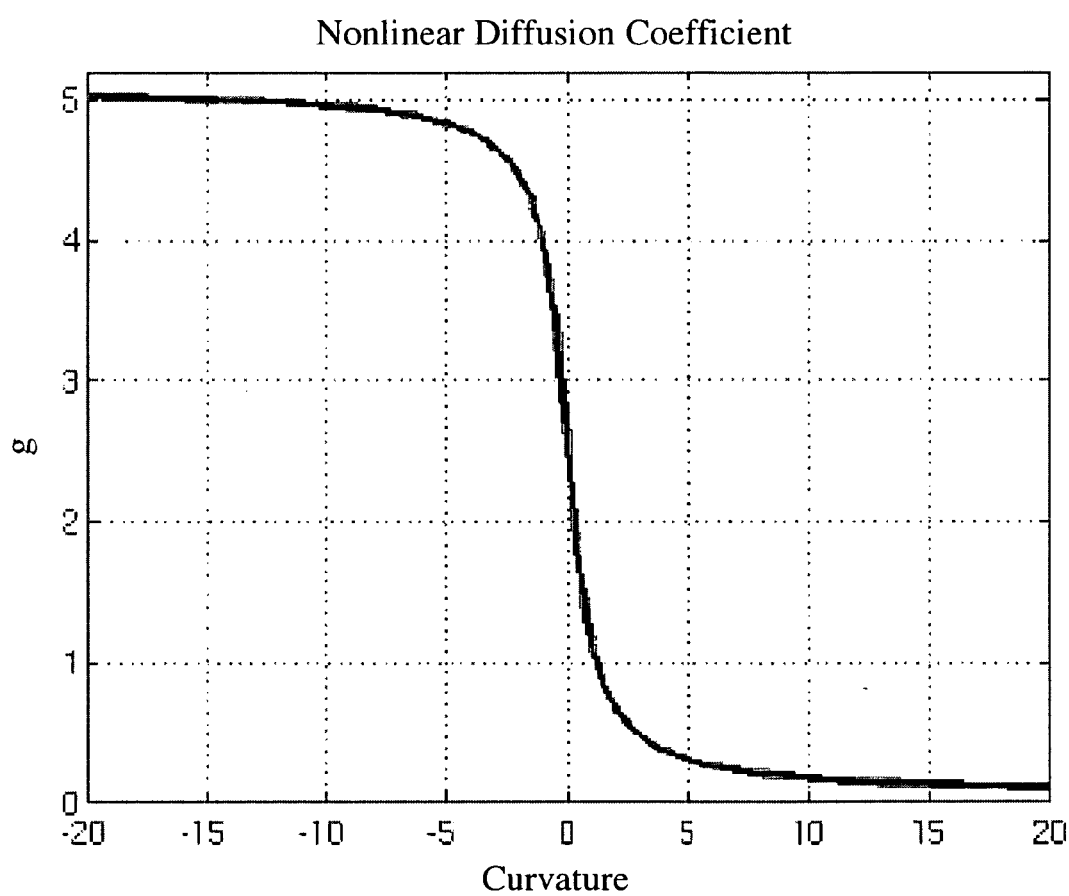
FIG. 1 shows a nonlinear part of the diffusion coefficient function $g(\kappa(r, t), t)$ as a function of the mean curvature of the iso-temperature surface. This function causes high diffusion at negative curvature regions that correspond to the bases of protruding structures like polyps.

The present method is aimed at detecting structures of interest from volumetric images and discriminate them from other protruding structures, non-protruding structures and/or stand-alone structures. In an exemplary embodiment, the protruding structures are for instance polyps, haustral folds, etc., whereby the protruding structures of interest are polyps. The non-protruding structures are for instance elongated structures, flat structures or structures in between haustral folds. In this example, both types of structures are on the flexible colon, which is herein considered the volume of interest. In another exemplary embodiment, the structures of interest are stand-alone structures such as lung nodules. In this example, the structures are within a lung, which is then considered the volume of interest. The following description contains details on the first embodiment. However, a person of average skill in the art would readily appreciate that these teachings would also apply to the second embodiment.

The primary observation is that if the colon lumen is thought to be initially heated to a constant level, then the heat diffusion process would generate local heat diffusion pattern singularities (sinks) near the centers of protruding structures. This can further be enhanced by using a nonlinear diffusion scheme that depends on the curvature of iso-temperature surfaces of the diffusing heat field. The diffusion proceeds faster in regions where the isotemperature surfaces are concave (necks of protruding structures) rather than the convex (apex of protruding structures). Note that, initially the colon wall itself is the only isotemperature surface. In other words, its effect is to have higher diffusion coefficients at the bases of protruding structures with respect to their apex. The heat diffusion field/pattern (HDF) can be described by a vector field $V(r)$, $r=[x\ y\ z]^T$ that is generated by tracking the motion of the isotemperature surfaces along their normal directions. V would have the aforementioned singularities near the centers of such structures. It is thus used to detect suspicious locations. Both the vector field geometry and local voxel distribution around such detected points are used to identify the polyps.

Segmentation

Segmentation of the colon lumen could be performed by any reasonably well performing segmentation scheme prior to the HDF as they are know in the art. Therefore, the invention is not limited to the following exemplary segmentation scheme whereby the colon lumen in each subvolume is segmented by simple thresholding followed by morphological filtering.

In this scheme, the CT data is converted to a binary volume ($S(r)$) by thresholding at 350 HU (CT(r)>350HU) $S(r)$=1 o.w. $S(r)$=0). $S(r)$=0 are the air voxels. Next, the isolated 1's in $S(r)$ are removed and 26-neighborhood morphological closing followed by a thinning operation is performed on the binary volume S to filter out segmentation noise using e.g. Matlab's built-in functions. Thus S=1 represents the tissue while its complement represents the colon lumen.

HDF Computation

The present method starts with the segmented colon lumen, $\{r|S(r)=0\}$, set to a constant temperature, $T_0$=1. It is then let cool. The diffusion process in governed by the nonlinear PDE given in Equation 1 (See for a general description Incropera et al. (2001) in a book entitled "*Fundamentals of Heat and Mass Transfer*" and published by Wiley). T(r, t) stands for the temperature at position r at time t. Equation 1 relates the rate of change in T(r, t) throughout the domain, to the divergence of the gradient of T(r, t) weighted by some scalar weight. The weighting factor, given by g, is the isotropic diffusion coefficient. It affects the amount of diffusion. Equation 2 relates this change in temperature to an instantaneous vector field v(r, t). v(r, t) represents the motion of the iso-temperature surface along its normal direction at the given position and time.

$$\frac{\partial T(r, t)}{\partial t} = \nabla \cdot g(\kappa(r, t), t) \nabla T(r, t) \qquad (1)$$

$$\frac{\partial T(r, t)}{\partial t} = -\nabla T(r, t) v(r, t) \qquad (2)$$

where $$g(\kappa, t) = \begin{cases} \dfrac{-5\arctan(1.2\kappa) + \dfrac{5\pi}{2} + 0.1}{5\pi + 0.1} \times D_{max} & t \leq N\Delta t \\ D_{max} & t > N\Delta t \end{cases} \qquad (3)$$

where $\kappa=\kappa(r, t)$ is the mean curvature of the iso-temperature surface passing through the point r at time t calculated from T(r, t), which is an implicit function for all iso-temperature surfaces (See for a general description Monga et al. (1995) in a paper entitled "*Using partial derivatives of 3d images to extract typical surface features*" and published in Computer Vision and Image Understanding 61(2):171-189). $\Delta t$=0.1 is the discretization time step. $D_{max}$ is the upper bound for the diffusion coefficient. Equation 3 states that a nonlinear spatially varying diffusion coefficient is applied during the first N iterations. The rest of the diffusion process is linear isotropic diffusion with a diffusion coefficient of $D_{max}$. FIG. 1 demonstrates the behavior of the nonlinear part of g.

Its role is to increase diffusion in regions with concave ($\kappa$<0) iso-temperature surfaces (like the base of polyps) with respect to the convex ($\kappa$>0) regions (like the apex of polyps).

Equating Equations 1 and 2, we get, $$-\nabla \cdot g \nabla T(r, t) = \nabla T(r, t) \cdot v(r, t) \quad (4)$$

$$T(r \in \{S(r) = 0\}, t = 0) = T_0$$

where g represents the nonlinear diffusion coefficient as given above. We can define the vector field V(r) as $$V(r) = \int_0^\tau |\nabla T(r, t)| v(r, t) dt, \; V \| \nabla T \quad (5)$$

$$= \int_0^\tau \left( \frac{\nabla T(r, t)}{|\nabla T(r, t)|} \right)(-\nabla \cdot g \nabla T(r, t)) dt$$

$$T(r, t) < 0.1$$

Figure 4:
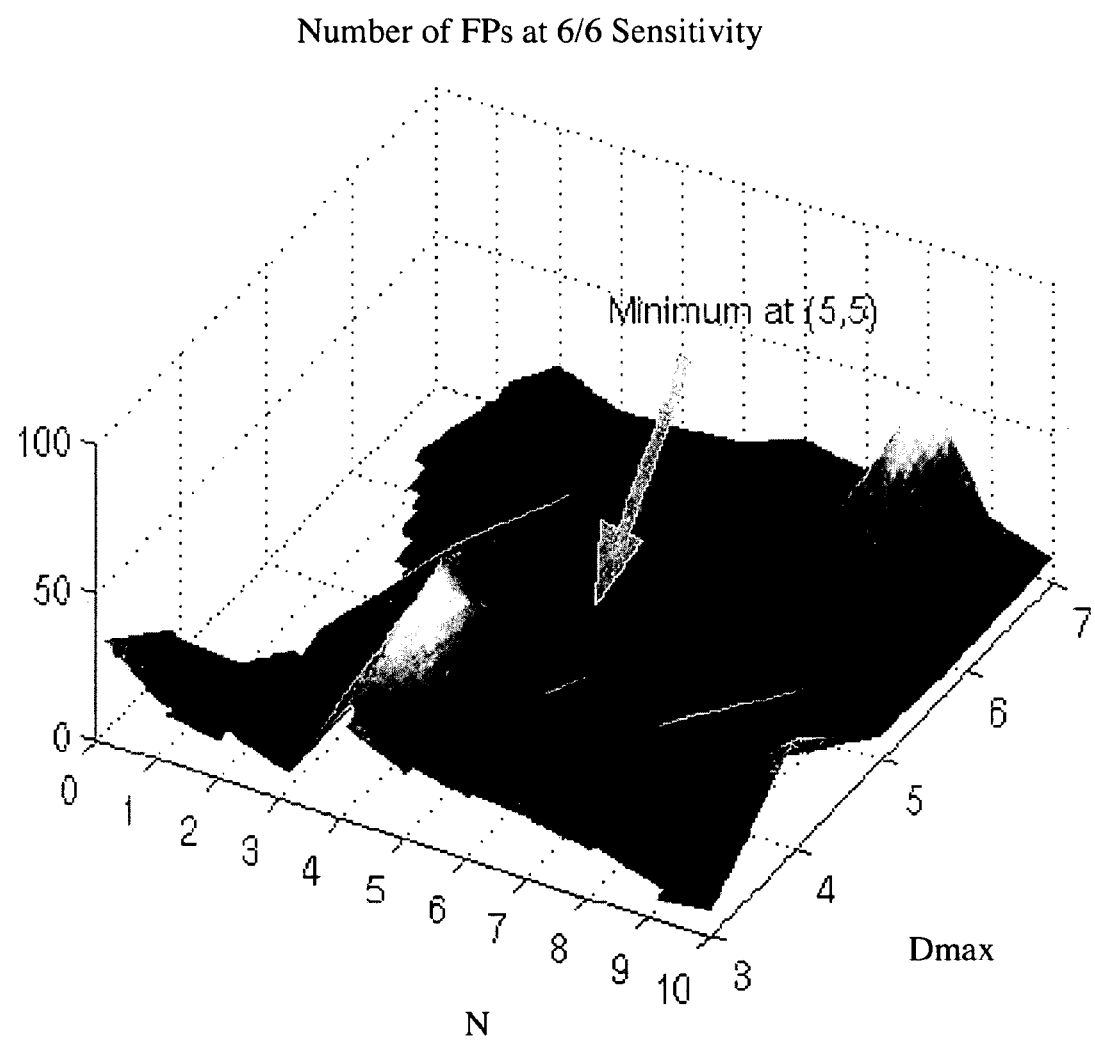
FIG. 4 shows FP rates at 100% sensitivity. The diffusion parameters N=5 and $D_{max}$=5 are chosen based on the minimum shown.

The HDF is the resultant vector field V(r) that is the integral of instantaneous field v(r, t) weighted by the temperature gradient over time (Equation 5) in regions where the current temperature is less than 0.1. This condition on updating V(r) as time proceeds is to make sure that mainly the leading heat front contributes to V(r). The geometrical characteristics of V will be used during the detection and the identification of colonic polyps together with a second parameter TU (See infra). We have empirically set N=5 and $D_{max}$=5. As FIG. 4 demonstrates, $5 \leq N \leq 10$ and $4 \leq D_{max} \leq 6$ are reasonable parameter choices. The major consideration in choosing these parameters is the following: N should be just large enough so that the nonlinear diffusion does have enough time to make the iso-temperature surfaces at the neck of polyps meet (in other words, block/close the neck). Too large N values causes the nonlinear diffusion last longer, affecting the geometry of the singularities. $D_{max}$ on the other hand, should be large enough so that the iso-temperature surfaces collapse at the polyp centers forming singularities and should be small enough to allow the HDF algorithm be able to track them (after all the method depends on the motion pattern of the iso-temperature surfaces. Both parameters can be related to the maximum polyp size of interest.

Figure 2:
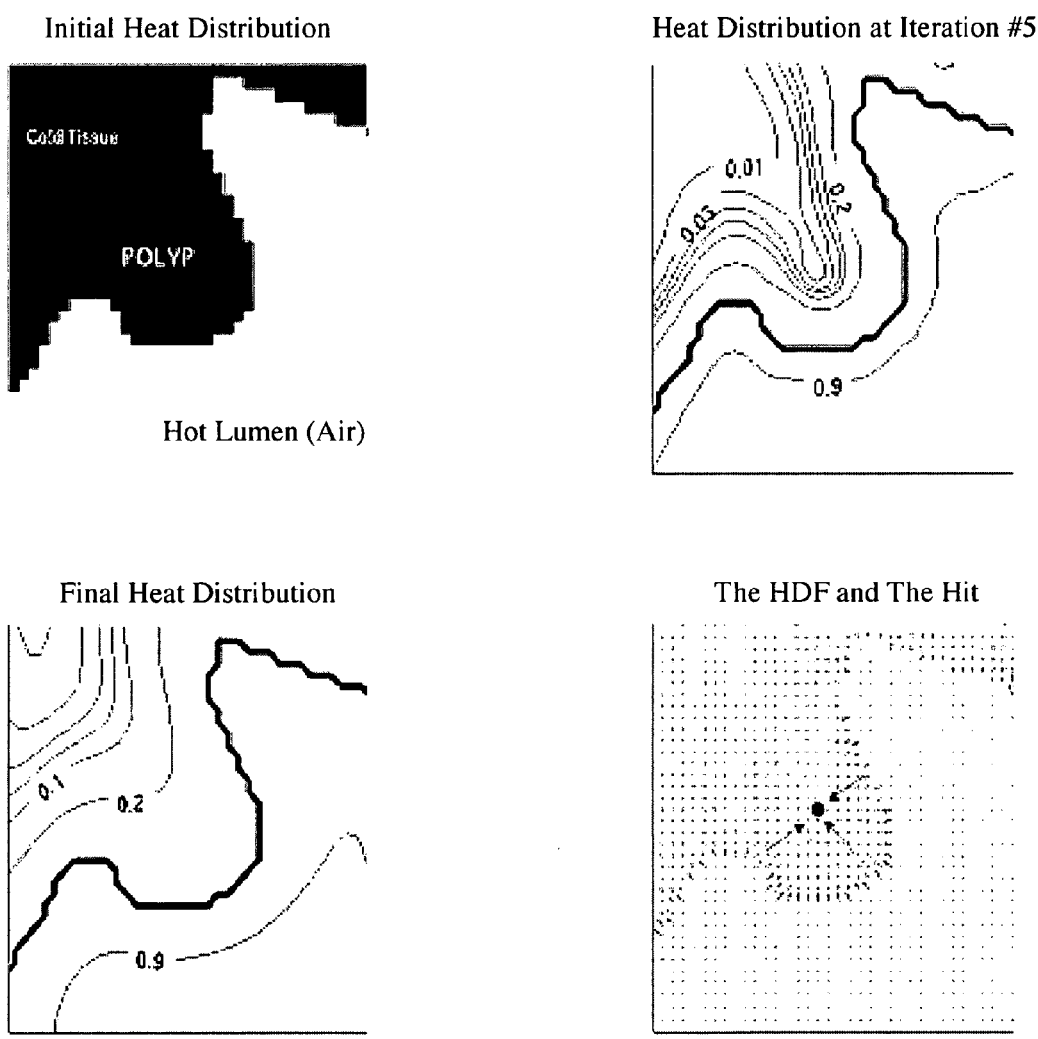
FIG. 2 shows the heat distribution on the central slice across a 8.9 mm polyp (a) just before diffusion starts, (b) at the end of the nonlinear diffusion part, and (c) after the final iteration are shown as iso-temperature contour plots. Plot (d) shows the computed vector field with the detected HDF hit marked. The bold line marks the colon wall. The Fractional Anisotropy (FA) value at the detected sink for this polyp is 0.028.

Numerical computation of the HDF, V(r), is done using Equation 5, where the continuous integration is replaced by discrete summation over a finite number of time intervals. The isotropic diffusion term in Equation 5 is solved numerically using the *Alternating-Direction Implicit (ADI) Method* (See for a general description Press et al. (1992) in a book entitled "*Numerical Recipes*" and published by Cambridge University Press, Cambridge). ADI is a variation of the Crank-Nicholson scheme and uses time division for efficient and unconditionally stable solutions. The numerical differentiation was done using a Gaussian derivative kernel with $\sigma$=0.6 mm and $\pm 2\sigma$ kernel support. FIG. 2 shows the heat distribution at different stages of the diffusion in the vicinity of a 8.9 mm polyp. The heat diffusion pattern singularity around the polyp center as time proceeds is apparent.

Detection

The proposed nonlinearity of the diffusion process is aimed at generating spherically symmetric singularities in the vicinity of polyp centers. However, a perfectly spherically symmetric vector field is not achievable due to polyp shape variations but can be approached. The differential characteristics of V are summarized by its Jacobian matrix J. For V(r) (a 3D vector field), J and its characteristic equation are defined as follows:

$$J = \begin{bmatrix} \frac{\partial V_x}{\partial x} & \frac{\partial V_x}{\partial y} & \frac{\partial V_x}{\partial z} \\ \frac{\partial V_y}{\partial x} & \frac{\partial V_y}{\partial y} & \frac{\partial V_y}{\partial z} \\ \frac{\partial V_z}{\partial x} & \frac{\partial V_z}{\partial y} & \frac{\partial V_z}{\partial z} \end{bmatrix} \quad (6)$$

$$|J - \lambda I| = \lambda^3 + P\lambda^2 + Q\lambda + R = 0 \quad (7)$$

$$P = -\text{trace}(J), \; Q = \frac{1}{2}(P^2 - \text{trace}(J^2)), \; R = -|J|$$

$$\Delta = R^2 + (4P^3 - 18PQ)R + 4Q^3 - (PQ)^2$$

where $\Delta$ is the discriminant of the third order characteristic polynomial given above and $\lambda$'s are the eigenvalues. The sinks sought correspond to the vector field points where the eigenvalues of J have all negative real parts close to each other. Their closeness (i.e. the spherical symmetry of V(r)) can be measured using the Fractional Anisotropy (FA) parameter which is defined as, $$FA = \sqrt{\frac{(\alpha_1 - \bar{\alpha})^2 + (\alpha_2 - \bar{\alpha})^2 + (\alpha_3 - \bar{\alpha})^2}{(\alpha_1^2 + \alpha_2^2 + \alpha_3^2)}}, \quad (8)$$

$$\bar{\alpha} = \frac{\alpha_1 + \alpha_2 + \alpha_3}{3}$$

where $\alpha_i$=Real($\lambda_i$), i={1, 2, 3}. FA=0 for perfectly spherically symmetric singularities. Thus FA represents the geometrical information embedded in the HDF: Smaller the FA is, more probable the structure is a polyp, provided that $\alpha_i$<0, i=1, 2, 3. The 3D Watershed Transform is used to segment the 3D buckets (watershed basins in 3D) in the 3D FA map (i.e. the geometry map, FA (x, y, z), in $R^3$) generated as explained above (See for general description on Watershed transformations Beucher et al. (1993) in a paper entitled "*The morphological approach to segmentation: The watershed transformation*" and published in a book entitled Mathematical Morphology in Image Processing pp. 433-481, M. Dekker, New York, USA). The minimum FA point in each bucket is marked as a hit. This stage is summarized as follows:

1. Compute $\alpha_i$=Real($\lambda_i$), i={1, 2, 3} for the whole volume.
2. Mark all points with $\alpha_i$<0, i={1, 2, 3} as Valid Points.
3. Compute the FA values for all Valid Points and assign FA=$-\infty$ for all Non-Valid Points (assigning $-\infty$ causes those point not to be segmented as water-shed basins by the Matlab's watershed function)
4. Segment the FA volume created in Step 3 using the watershed transform (WT) [SEE 25]. WT labels the FA buckets in 3D.
5. Exclude the FA buckets that touch the volume boundaries.
6. Mark the minimum FA points in each bucket as a HDF Hit as long as it is in the tissue.

Identification

The FA parameter, in other words the spherical symmetry concept, is especially useful in discriminating folds from polyps. The elongated structure of the folds results in a V(r) that is 2D symmetric only on the plane perpendicular to the fold's main axis. This means $\min_i\{|\alpha_i|\} \cong 0$ which results in high FA values. However, FA alone is not sufficient to eliminate all non-polyp hits. There are hits with low FA values just because there are nearby air voxels distributed around somewhat uniformly, like at the junction of folds. To overcome this problem, we perform a local analysis of the colon wall around the hits and compute a Triangulization Uniformity (TU) parameter. TU is used together with FA for identification. The primary idea behind TU is that there should be air voxels around a polyp that are direction-wise uniformly distributed over a spherical surface patch (colon wall). We mark the azimuth and the elevation angles of the closest air voxels within a certain distance (15 mm is used as an arbitrary choice) in M directions (M=100 as an arbitrary choice) on a unit sphere. These points are determined by shooting rays from suspicious locations outwards for the above described and pre-defined distance and checking whether we have met an air-voxel or not. These points should form a single cluster on the unit sphere for polyps and be uniformly distributed with in this cluster. We perform a Delaunay Triangulation of the surface defined by these points and use the number of triangles and the trimmed variance of their areas to measure this as follows:

$$A_i, i = 1, \ldots, K : \text{Triangle areas} \quad (9)$$

$$\tilde{A} = \{\text{Smaller } 90\% \text{ of } A_i's\}$$

$$\sigma_{\tilde{A}}^2 = VAR_i(\tilde{A})$$

$$TU = \frac{\tilde{K}}{\sigma_{\tilde{A}}^2}$$

where $\tilde{K}$ denotes the number of triangles in the reduced set $\tilde{A}$. The largest 10% of $A_i$'s is excluded from the variance calculation because the polyps are more likely to be hemispherical structures rather than spherical ones. This means that there will be large triangles at the bases of polyps that would increase $\sigma_{\tilde{A}}^2$ artificially. TU is larger for polyps.

Evaluation

We used Free Response Receiver Operator Characteristic (FROC) curves to evaluate the performance of our method (See for evaluation method Chakraborty et al. (1990) in a paper entitled "*Free-response methodology: Alternate analysis and a new observer performance experiment*" and published in *Radiology* 174(3):878-881, 1990). FROC curves show the trade-off between sensitivity (detection rate of true positives (TP)) and the detection rate of false positives (FP). They are especially suitable for the performance evaluation of detection algorithms as opposed to pure classification algorithms as the set of negatives is not well-defined. In other words, all points in the 3D data except the inner regions of polyps are potential negatives. Since this corresponds to using a large number in the denominator for the conventional definition of specificity, it would be misleading.

We used CTC data acquired from a 56 year old female patient to determine it. The patient was scanned in the prone position in an 8 slice multi-detector row CT scanner (GE Lightspeed Ultra, Milwaukee, Wis.) in the 4 slice helical mode (slice width=2.5 mm, pitch=0.75, slice spacing=1.25 mm, FOV=36 cm reconstructed on a 512°-512 matrix, kV=120, mA=120). She underwent fiberoptic colonoscopy immediately after the CT scan 47 polyps were reported by the radiologist—7 larger than 8 mm. Subvolumes of 30 mm³ with 20 mm overlaps, covering the whole colon wall were processed. The average voxel spacing was 0.74 mm×0.74 mm×1.31 mm and the data was interpolated to 0.6 mm×0.6 mm×0.6 mm prior to processing. A wide range of polyp shapes were present in the dataset.

Figure 3:
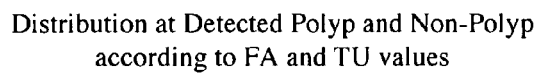
FIG. 3 shows the Fractional Anisotropy (FA) versus Triangulization Uniformity (TU) distribution of the HDF hits for the patient for polyps larger than 8 mm in diameter. Two FROC curves for two different FA thresholds specified.
Figure 3:
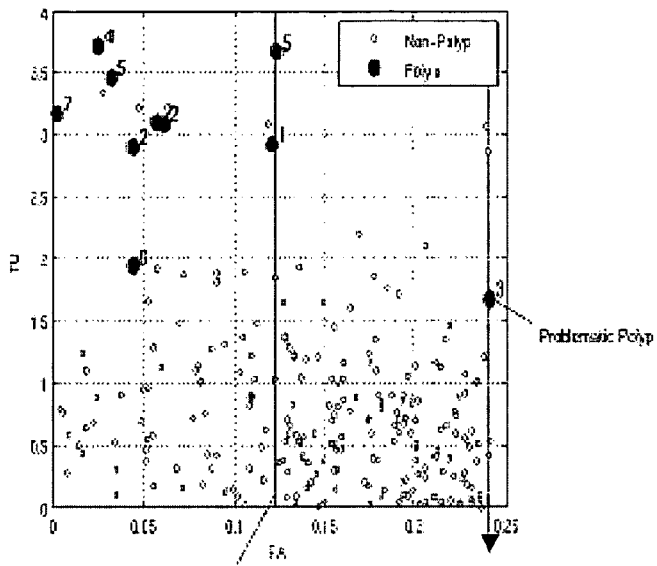
Figure 3:
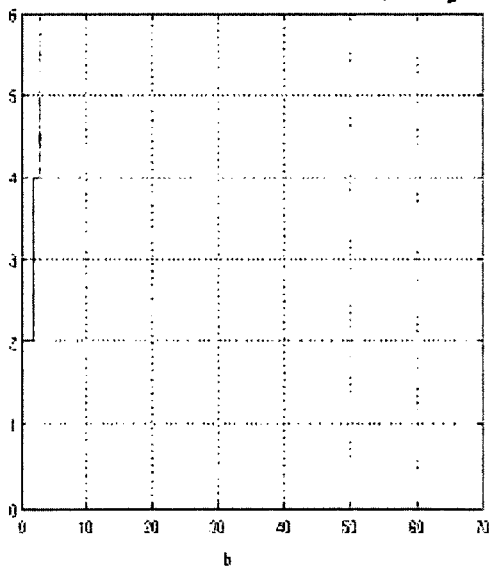
Figure 3:
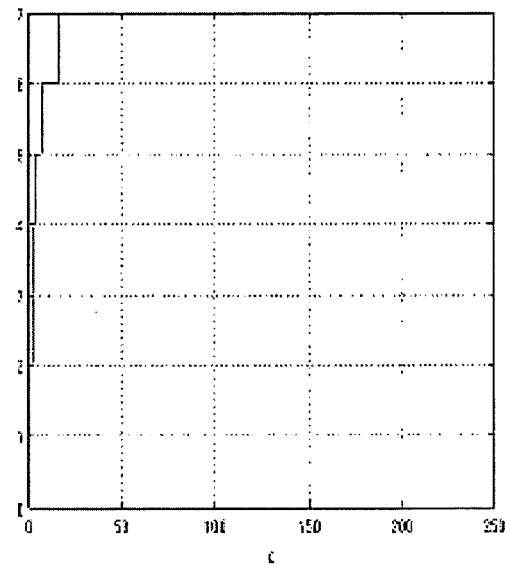

The gold standard was generated by a radiologist with 8 years of experience in CTC, who marked the centers of FOC (Fiber Optic Colonoscopy) confirmed polyps and measured their diameters using a custom-built computer program. Those center points and the diameter measurements specify spherical regions. All hits in such a sphere are considered as TPs associated with the same polyp and are labeled accordingly. Assuming that the vector field around the detected sinks inside the true polyps are more spherically symmetric than sinks associated with nonpolyp structures, we sorted all of the detected points starting from the most spherically symmetric one in a descending order. We then went through this list starting from the top, keeping the top most one and eliminating all of the other points down the list, closer to that hit more than the radius of the smallest polyp of interest ($\xi$), which is set by the user. The underlying idea is that the centers of two polyps of interest (assumed to be a hemispherical structure in general) cannot be closer to each other less than $\xi$. We also limited $\epsilon$ to be larger than or equal to 1.5 mm. This process also eliminates multiple hits, which may occur due to using overlapping subvolumes. This grouping strategy is only based on the a priori preference that the user (the radiologist) would have made regarding the size of polyps he/she is interested in, simulating a clinical application. The final identification is done on the 2D (FA, TU) domain using simple thresholding. An FA threshold, $\epsilon_{FA}$, and a TU threshold, $\epsilon_{TU}$ are varied through the list of hits, $\Omega$. The subset of $\Omega$ with FA<$\epsilon_{FA}$ AND TU>$\epsilon_{TU}$ is the output positive set, $\Psi$. If a point in $\Psi$ is within a polyp (defined by the polyp center and diameter determined by the radiologist) then it is associated with that polyp and labelled, otherwise it is left unlabelled. The number of points in $\Psi$ that are left unlabelled is the number of FPs at that ($\epsilon_{FA}$, $\epsilon_{TU}$) pair. The number of TPs is the number of polyps with at least one voxel (from the inner region of that polyp) in $\Psi$. Multiple detections within a single polyp are considered as a single TP. A 1D FROC curve is computed for each $\epsilon_{FA}$. The combination of these curves make up a 2D FROC surface. The evaluation is based on the FP and sensitivity rates corresponding to ($\epsilon_{FA}$, $\epsilon_{TU}$) pairs. FIG. 3 summarizes some results of the evaluation.

The present invention has now been described in accordance with several exemplary, which are intended to be illustrative in all aspects, rather than restrictive. Thus, the present invention is capable of many variations in detailed implementation, which are all considered part of the claimed invention. For instance, the proposed nonlinearity is not necessarily the only function that can be used in the HDF method. For example, some other monotonically decreasing function of $\kappa$ with a smooth transition is expected to perform similarly. Another variation relates to the use of thresholding in a 2D parameter space of FA and TU. This is not necessarily the only identification scheme as a person of average skill in the art would readily appreciate. Another approach would be to train a general purpose classifier to discriminate between polyps and non-polyps among the hits. Support Vector Machines are good candidates for this. A natural extension of the present invention is to use the *Interface Propagation Methods* (See for a general description a book by Sethian et al. (2001) entitled "*Level Set Methods and Fast Marching Methods*, and published by Cambridge) to propagate the iso-temperature surfaces and/or any other surface defined in the volume interest and to use that surface in detection and identification tasks. All such variations and other variations are considered to be within the scope and spirit of the present invention as defined by the following claims and their legal equivalents.

What is claimed is:

1. A computer-implemented method operable on a computer for detecting and identifying structures of interest in computed tomographic (CT) volumetric images, comprising the steps of:
   (a) obtaining a heat diffusion field of a volume of interest with structures from a CT volumetric image available on said computer by applying a heat diffusion scheme to said volume of interest with structures;
   (b) mapping said obtained heat diffusion field to a vector field of said structures; and
   (c) identifying a structure of interest from said structures using a geometrical analysis of said vector field of said structures, wherein said geometrical analysis comprises computing a spherical symmetry parameter from said mapped vector field of said structure of interest, and wherein said identifying comprises performing a local analysis of the area around said structure of interest and computing a triangulization parameter of said area, whereby both said spherical symmetry parameter and said triangulization parameter are used for the identification of said structure of interest.

2. The method as set forth in claim 1, wherein said heat diffusion scheme is at least partly governed by non-linear diffusion parameters.

3. The method as set forth in claim 1, wherein said structures comprises protruding structures and non-protruding structures, and said structure of interest is one of said protruding structures.

4. The method as set forth in claim 3, wherein said protruding structures are polyps, haustral folds or other elongated structures, and wherein said structure of interest is a polyp.

5. The method as set forth in claim 3, wherein said non-protruding structures are flat colon wall regions and regions in between haustral folds.

6. The method as set forth in claim 1, wherein said volume of interest is a colon or a colon wall and said structure of interest is a polyp.

7. The method as set forth in claim 1, wherein said volume of interest is a lung, said structures comprises stand-alone structures, and said structure of interest is a lung nodule.

* * * * *

UNITED STATES PATENT AND TRADEMARK OFFICE
CERTIFICATE OF CORRECTION

| | | |
|---|---|---|
| PATENT NO. | : 7,729,739 B2 | Page 1 of 1 |
| APPLICATION NO. | : 11/000515 | |
| DATED | : June 1, 2010 | |
| INVENTOR(S) | : Acar et al. | |

It is certified that error appears in the above-identified patent and that said Letters Patent is hereby corrected as shown below:

In the Specification Under Column 1:

• Please replace Column 1, line no. 12-17 with:

-- FEDERALLY-SPONSORED RESEARCH OR DEVELOPMENT
  This invention was made with Government support under contract CA72023 awarded by the NIH National Cancer Institute. The Government has certain rights in this invention. --

Signed and Sealed this
Thirtieth Day of April, 2013

Teresa Stanek Rea
*Acting Director of the United States Patent and Trademark Office*